May 19, 1959
A. T. PIIP
2,887,651
INDUCED CURRENT TESTING APPARATUS
Filed Feb. 17, 1956
4 Sheets-Sheet 1
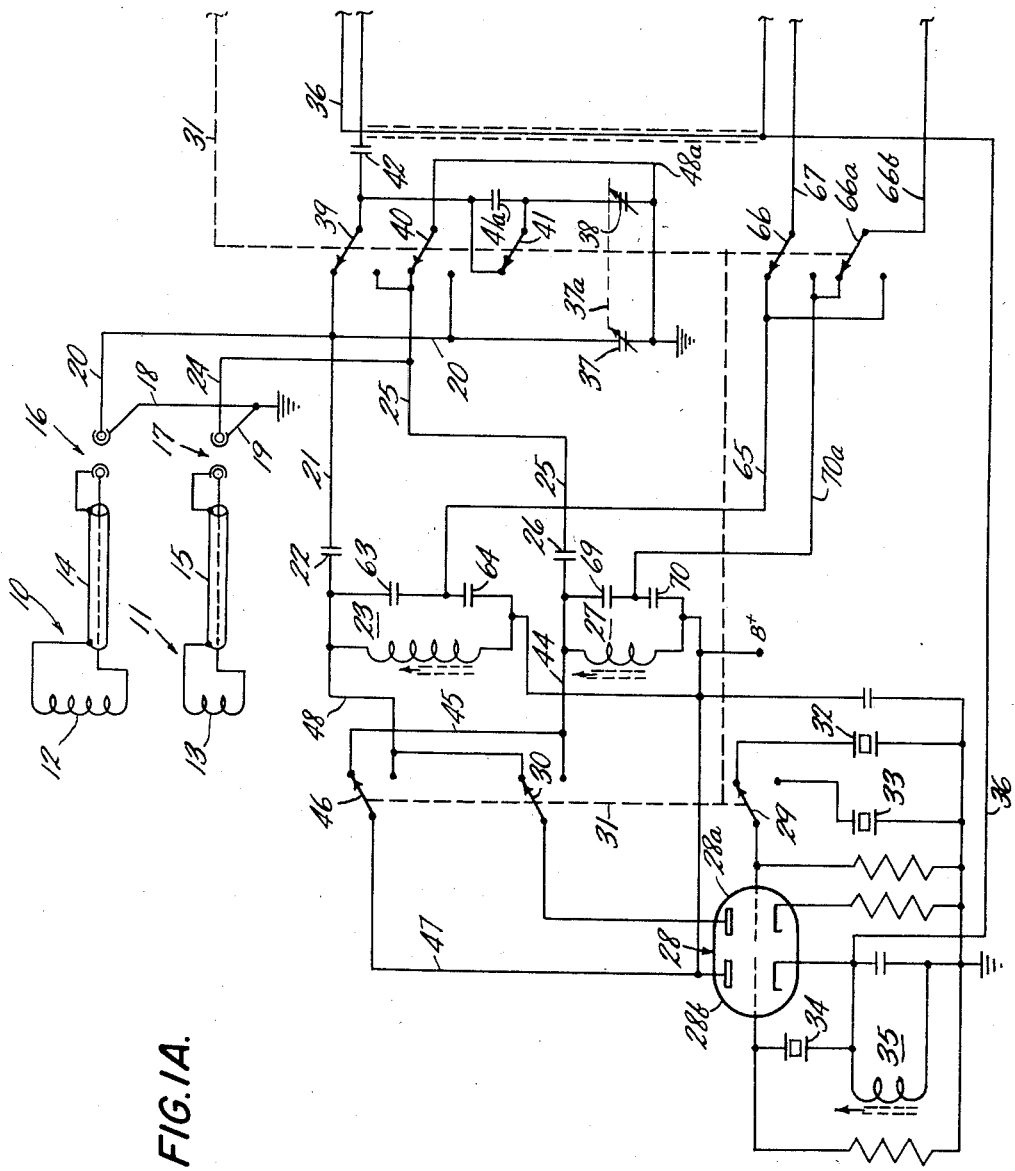
FIG. IA.
INVENTOR.
ANTS T. PIIP
BY
Campbell, Brumbaugh, Free & Graves
his ATTORNEYS May 19, 1959     A. T. PIIP     2,887,651
INDUCED CURRENT TESTING APPARATUS
Filed Feb. 17, 1956     4 Sheets-Sheet 3

INVENTOR.
ANTS T. PIIP
BY
Campbell, Brumbaugh, Free & Graves
his ATTORNEYS

May 19, 1959
A. T. PIIP
2,887,651
INDUCED CURRENT TESTING APPARATUS
Filed Feb. 17, 1956
4 Sheets-Sheet 4
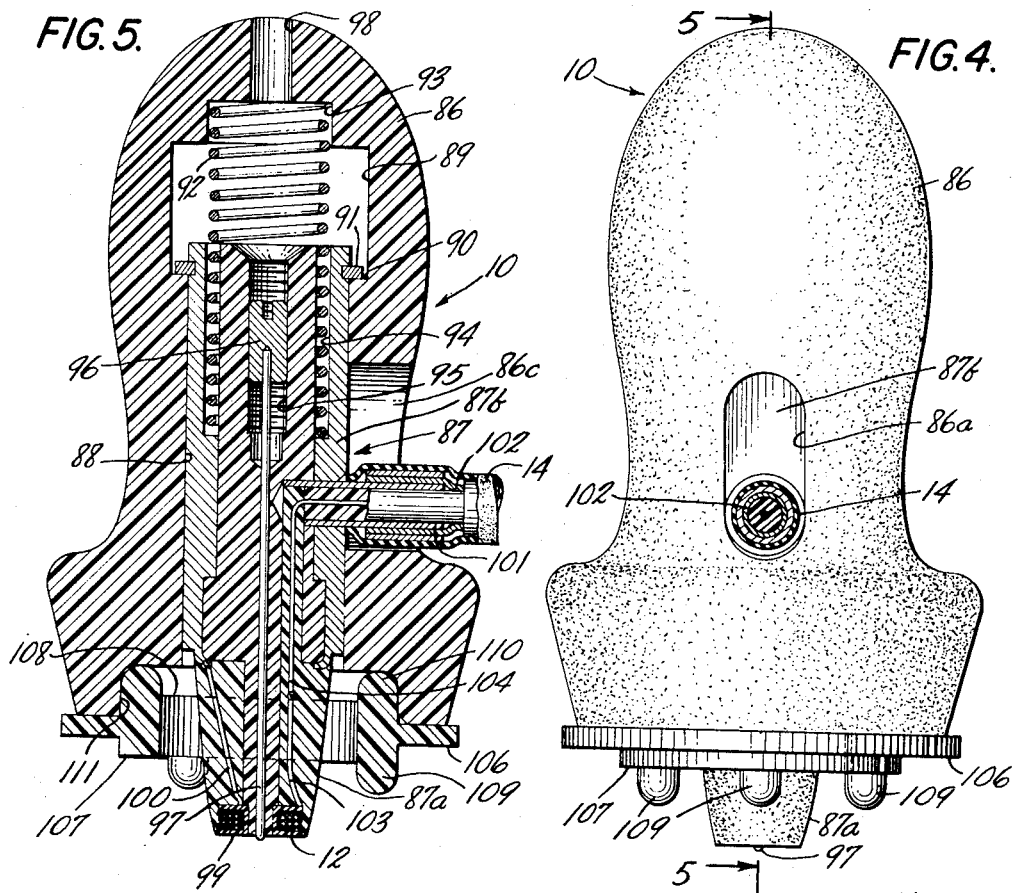
INVENTOR.
ANTS T. PIIP
BY
Campbell, Brumbaugh, Free + Graves
his ATTORNEYS United States Patent Office 2,887,651
Patented May 19, 1959

2,887,651

INDUCED CURRENT TESTING APPARATUS

Ants T. Piip, Denville, N.J., assignor to Boonton Radio Corporation, Parsippany-Troy Hills Township, N.J., a corporation of New Jersey Application February 17, 1956, Serial No. 566,155

10 Claims. (Cl. 324—34)

This invention relates to testing apparatus useful in connection with conductive materials and, more particularly, to apparatus for measuring the thickness of a thin film on a basis material.

Many instruments have been devised for determining the characteristics of metal for various purposes such, for example, as measuring film thickness and testing for defects in metal pieces. In determining film thickness, destructive testing methods have been extensively used, not through choice but through necessity, since it has proven to be a reliable test, particularly in the event extremely thin films are involved. This is, of course, an unsatisfactory solution since it does not lend itself to production line methods and results in the loss of any article undergoing the test. Furthermore, such tests are often expensive and time consuming and, therefore, not at all practical except in the laboratory.

Attempts have been made to measure metal film thickness and the thickness of nonmetallic films on metal basis materials by means of induced currents but these have met with only limited success. Primarily, the past instruments for performing such tests have been critical in adjustment and operators have been unable to produce with any satisfactory degree of uniformity thickness readings of the desired accuracy.

In those instruments relying on the use of induced eddy currents in a metal film or basis material, such induced currents reflect a certain impedance having magnitude and phase components into a probe. Since the magnitude components are highly variable depending upon the distance of the probe from the metal surface and the angle of the probe coil with respect to the metal surface, it has heretofore been impossible to provide an instrument that would consistently reproduce thickness measurements accurately. Furthermore, the measurement of both magnitude and phase angle signal variations requires complicated circuitry and indicating devices in order to determine the film thickness from their relationship.

The present invention overcomes the above difficulties, this being accomplished by positioning a coil in a tunable resonant circuit adjacent to a conductive surface and energizing the resonant circuit with an alternating voltage shifted in phase with respect to a reference voltage. Suitable circuitry amplitude limits the voltage delivered by the coil and the reference voltage to eliminate effects due to the magnitude components of the reflected impedance and produces a signal representative of the phase difference between them. The phase difference signal, when referenced to a standard calibrating signal, provides an accurate indication of the film thickness. If the film is nonconductive, it must of course be on a conductive basis material, the instrument responding to the currents induced in the basis material and its spacing from the coil.

In a preferred embodiment of the invention, two probes selectively energized by high and low frequencies are employed to cover a wide range of film thickness. The energizing frequency chosen for each of the probes is determined by the characteristics of the film and its thickness, the higher frequency providing greater accuracy when measuring extremely thin films. A feature of the invention resides in the use of a local oscillator to heterodyne the higher frequency to a lower frequency so that the same detecting and indicating circuitry may be employed in connection with both probes.

It is important that the coil be accurately positioned with respect to the surface being tested and to achieve this, the present invention provides a special coil carrying probe. The probe is constructed to assume a position perpendicular to flat or curved surfaces against which it is urged, the coil being spaced a selected distance from such surfaces. In addition, the tip of the probe carrying the coil bears against the tested surface with a selected pressure unaffected by the pressure exerted on the probe housing.

These and further advantages of the invention will be more readily understood when the following description is read in connection with the accompanying drawings in which:

Figures 1A and 1B taken together form a schematic circuit diagram of a film thickness gauge embodying the principles of the present invention;

Figure 4 is an elevation of a typical probe that may be utilized in connection with the circuitry of Figures 1A and 1B;

Figure 5 is a longitudinal section of the probe of Figure 4 taken on the view line 5—5 looking in the direction of the arrows;

Figure 6 is an end view of the probe illustrated in Figure 4;

Figure 7 is a view in perspective of one side of a contact ring employed with the probe of Figure 4; and Figure 8 is a view in perspective of the other side of the contact ring illustrated in Figure 7.

Figure 1B:
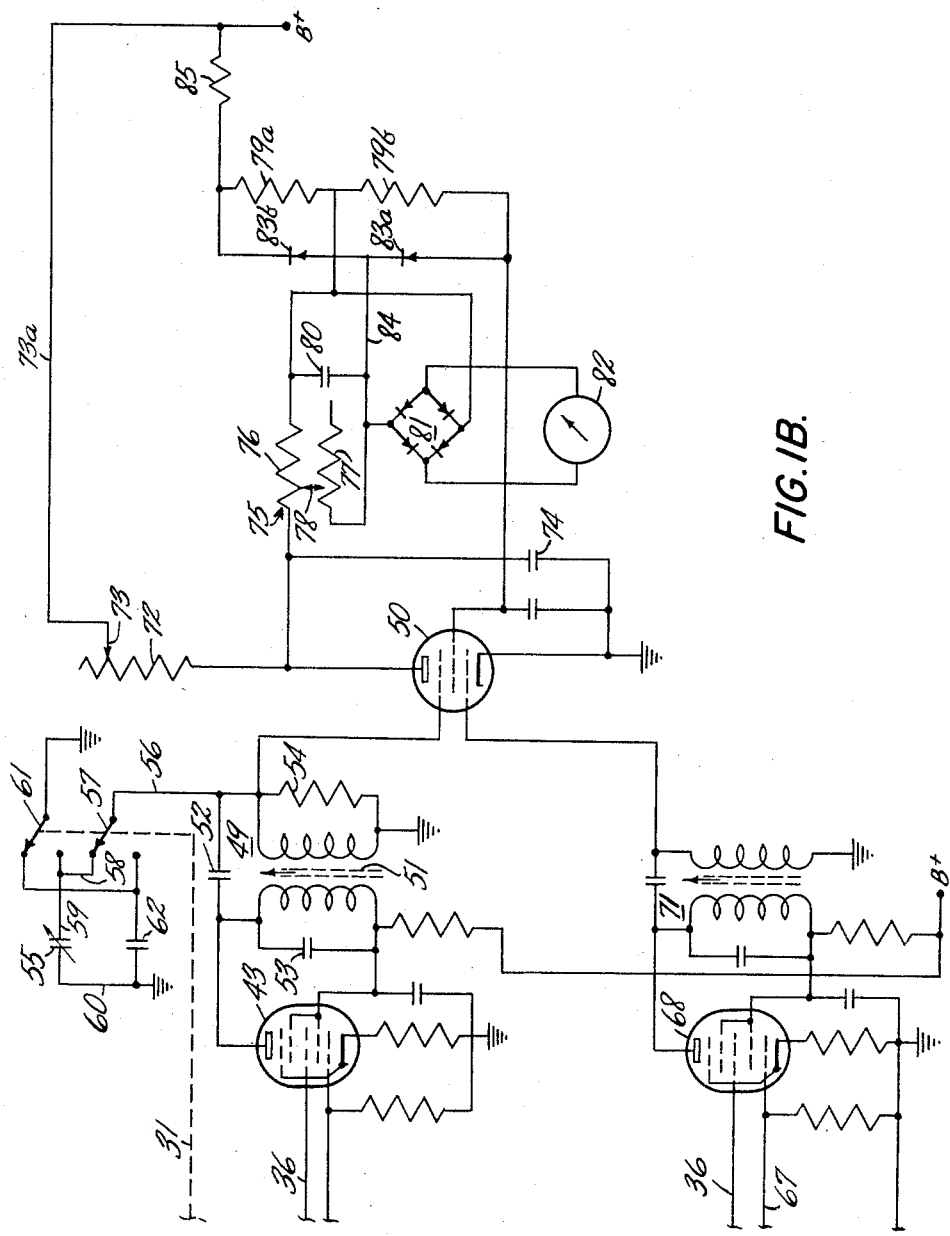

Referring to a typical embodiment of the invention in greater detail with particular reference to Figure 1A, a pair of probes 10 and 11 carrying coils 12 and 13 are selectively joined to a film thickness gauge by conventional shielded coaxial cable 14 and 15 and connectors 16 and 17, respectively. One contact of each of the connectors 16 and 17 is joined by conductors 18 and 19 to ground, the other contact of the connector 16 being respectively coupled through conductors 20 and 21 and a phase shift capacitor 22 to an oscillator tank circuit 23. The remaining contact of the connector 17 is joined by conductors 24, 25 and a phase shift capacitor 26 to a further oscillator tank circuit 27.

A dual triode 28 includes a triode 28a connected as a dual frequency plate tuned crystal oscillator by switch armatures 29 and 30. When the switches 29 and 30 are positioned as shown by a conventional mechanical linkage 31, a crystal 32 having a resonant frequency of 500 kilocycles (kc.), for example, is placed in circuit with the triode 28a and the tank circuit 23 connected to complete the oscillator circuit. When the switches 29 and 30 are shifted, a crystal 33 having a resonance of 8 megacycles (mc.), for example, is tied to the grid of the triode 28a while the tank circuit 27 is coupled to its plate.

From the foregoing, it is apparent that the probes 10 and 11 are selectively energized at 500 kc. and 8 mc., respectively, depending upon the position of the switches 29 and 30. It is desirable to couple 500 kc. signals through the instrument to the phase detector, explained in detail hereinafter, and to accomplish this with the use of an 8 mc. probe, the other section 28b of the dual triode 28 is connected to function as a local oscillator in a heterodyning system. A 7.5 mc. crystal 34 in the grid-cathode circuit of the triode 28b fixes the frequency of this oscillator which includes the cathode connected resonant circuit 35. Accordingly, a heterodyning signal is coupled from the cathode of the triode 28b on a conductor 36.

Grounded trimmer capacitors 37 and 38 are connected in the low frequency switch position across the coil 12 by the conductor 20 and by ganged switches 39 and 41, the capacitor 38 and a capacitor 41a being series connected across the coil 13 in the high frequency switch position by the conductors 24 and 25, and ganged switches 39 and 41. A mechanical coupling 37a gangs the capacitors 37 and 38 and may be adjusted to tune the resonant probe circuits with the coils 12 or 13 positioned adjacent to a basis material, as will be discussed in detail below. It will be observed that the ganged switch 41 selectively inserts the capacitor 41a in series with the trimmer capacitor 38 for high frequency operation.

Depending upon the position of the switches 39, 40 and 41 which are ganged with switches 29 and 30 through the mechanical coupling 31, signals across the coil 12 or the coil 13 will be coupled by a capacitor 42 to a first control grid in a heptode 43 (Figure 1B). It will be observed that the conductor 36 is also joined to a second control grid of the tube 43 and with the ganged switches positioned to energize the high frequency probe 13, the 8 mc. signals on the first control grid will beat with the 7.5 mc. heterodyning signals furnished to the second control grid to provide 500 kc. difference signals at the plate of the tube 43. However, with the ganged switches in their low frequency position, the resulting high frequency sum and difference signals may be neglected in view of the use of a tuned plate circuit for the tube 43 discussed in detail hereinafter.

With the switches in their low frequency position, as shown in Figure 1A, conductors 44, 45, a switch 46 and a conductor 47 join one end of the high frequency tank circuit 27 to the A.-C. grounded plate of the triode 28b. Similarly, with the ganged switches in their high frequency position, one end of the low frequency tank circuit 23 is coupled to the grounded plate of the triode 28b through a conductor 48, the switch 46 and the conductor 47. It should also be noted that a conductor 48a cooperates with the switch 40 to ground the coil 12 or 13 not being utilized.

Signals on the plate of the tube 43 are coupled by a network 49, tuned to 500 kc., to one grid of a gated beam tube 50 such, for example, as a 6BN6. The coupling network 49 basically consists of a unity coupled transformer 51 in order to provide a low transfer impedance at a low D.-C. resistance, proper operating conditions for inputs to the tube 50. More particularly, it is difficult to construct unity coupled coils (bifilar) of the required inductance, especially in view of the fact that there is a 100 volt potential between the windings. Therefore, to short the leakage inductance between coils, the high R.-F. ends are coupled together by a capacitor 52 which has low reactance at the frequencies in question. The sharpness of tuning of the resulting network 49 depends only on the L and Q of both coils in parallel, the low transfer impedance on the capacitor 52 and the low D.-C. resistance on the D.-C. resistance of the secondary winding.

A tuning capacitor 53 shunts the primary coil of the transformer 51 while a resistor 54 shunts the secondary coil of the transformer to approximate the damping of the second control grid of the tube 50 with that of the first control grid. A capacitor 55 joined to the secondary coil through a conductor 56, a switch 57 and conductors 58, 59 and 60 may be adjusted to phase shift signals from the probes 10 or 11 for balancing purposes.

It will be observed that with the switches in their high frequency range position, a further switch 61 ties the capacitor 55 to ground while the switch 57 couples a capacitor 62 to the network 49. Adjustment of the transformer 51 and another transformer to be described below provides the desired balance for high frequency operation of the instrument.

Examining next a reference phase signal coupling channel in Figures 1A and 1B which furnishes signals to the second grid of the gated beam tube 50, the tank circuit 23 for the low frequency oscillator is provided with split capacitors 63 and 64, their common point being coupled by a conductor 65, a further ganged switch 66 and a conductor 67 to a grid of another heptode 68. In the event that the ganged switches are in their high frequency position, the signals will be coupled from the common point of split capacitors 69 and 70 in the tank circuit 27 by a conductor 70a which is tied by the switch 66 and the conductor 67 to the heptode 68. The voltages obtained from the split capacitors 63, 64 or 69, 70 are in phase with the voltages across the respective tank circuits and serve as reference phase voltages, as will be explained in greater detail hereinafter. It will be observed that a further ganged switch 66a grounds the common point of the split capacitors not in use through a conductor 66b to aid in stabilizing these circuits.

With the ganged switches in their low frequency position, signals on the plate of the heptode 68 are coupled by a network 71, similar to the network 49, to the second grid of the gated beam tube 50. When the ganged switches are displaced to their high frequency position, the heterodyning signals on the conductor 36 being fed in parallel to the second control grids of the heptodes 43 and 68 cause each of these tubes to function as a mixer, the 7.5 mc. signals mixing with the 8 mc. signals to produce 500 kc. signals on the output plates having the same relative phase relation as the 8 mc. signals in the input circuits. Although the tubes 43 and 68 function as mixers in the high frequency switch position, the signal strengths on the plates of the tubes 43 and 68 will be substantially the same as in the low frequency range since the split capacitors 69 and 70 will furnish a higher percentage of the voltage across the tank 27 than do the capacitors 63 and 64 of the voltage across the tank 23. In either case, the two grids of the gated beam tube 50 are so highly overdriven that any differences in signal strengths will be of no consequence.

Due to the phase difference between the signals amplified by the tubes 43 and 68 in the low or high frequency switch positions, the gated beam tube 50 provides output pulses which are indicative of the difference in phase of the input signals on its two grids. The manner of operation of gated beam tubes is well known and need not be described in detail. However, it should be noted that in this circuit, the tube 50 functions as an amplitude limiter and a phase detector because its grids are highly overdriven to saturate it during substantially all of the time that it conducts. It should be understood that in place of the gated beam tube 50 separate limiters and a phase detector may be employed. It is most important that limiting be provided since the present invention relies on the elimination of the magnitude component of impedance reflected to the probe to overcome the undesirable characteristics of prior thickness gauges.

The plate of the tube 50 is energized through a variable resistor 72 provided with a movable tap 73 coupled by a conductor 73a to B+. A condenser 74 connected between the plate of the tube 50 and ground integrates plate current pulses, the plate also being coupled to a sensitivity control 75 which comprises a pair of resistors 76 and 77 joined by a movable tap 78. One end of the resistor 76 is joined to the plate of the tube 50 while its other end is connected to the common point of two identical resistors 79a and 79b. A bypass condenser 80 also joins one end of the resistor 77 to the end of the resistor 76 remote from the tube 50, as shown in Figure 1B. The sensitivity control is arranged as shown to provide a relatively high and constant resistance at its output to a full wave rectifier bridge 81. A meter 82 energized by the rectifier bridge 81 accordingly sees a substantially constant damping resistance.

Figure 3:
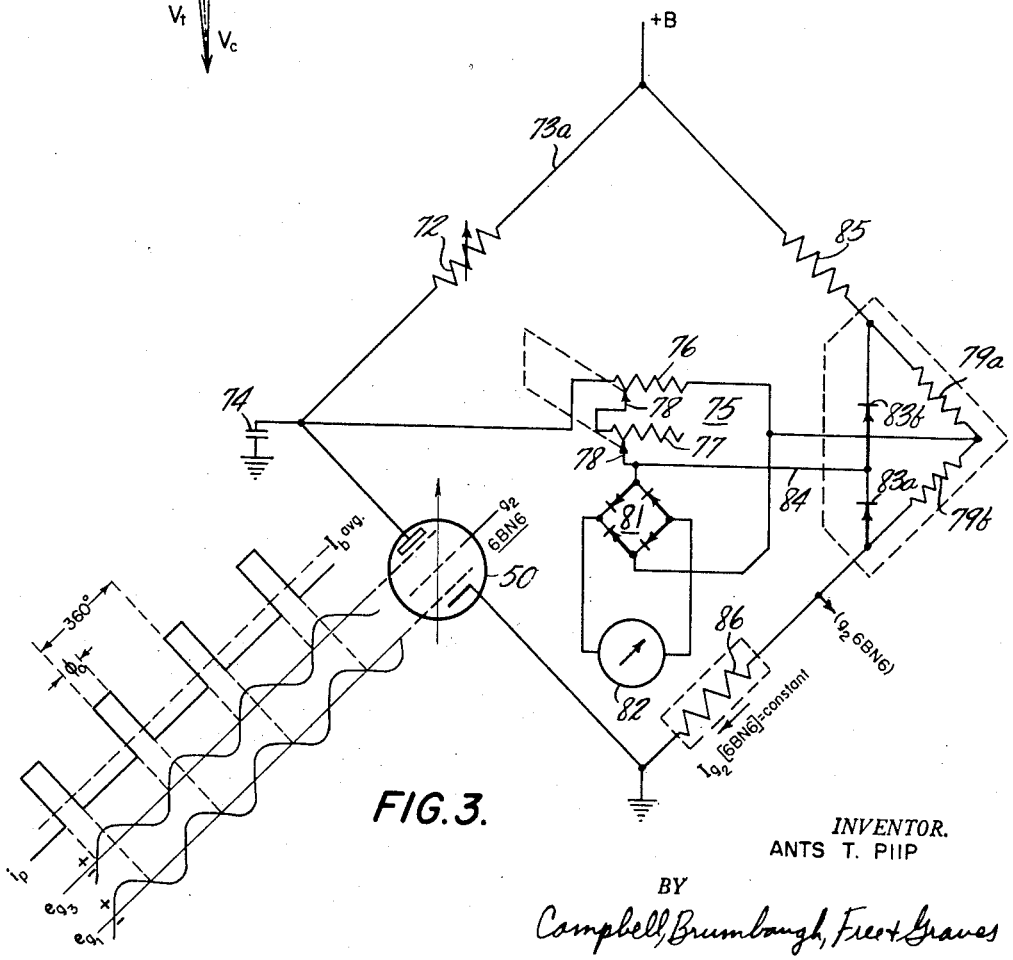
Figure 3 is a schematic circuit diagram, rearranged for clarity, of the indicating bridge circuit of Figure 1B.

It should be observed that the full wave rectifier bridge 81 prevents reverse movement of the meter regardless of the sense of the signals received from the plate of the tube 50. In order to protect the meter 82, a pair of crystal rectifiers 83a and 83b shunt the resistors 79a and 79b, the common point of these elements being joined by a conductor 84 to the input of the rectifier bridge 81. A resistor 85 joined to B+ forms part of one arm of a bridge which includes the entire indicating circuit, as best shown in Figure 3 and explained below.

In order to determine the characteristics of conductive materials and, in particular, the thickness of a conductive film on a basis material or a nonconductive film on the conductive basis material, a suitable probe must carry the coils 12 and 13 so that they may be uniformly positioned closely adjacent to the surface to be tested. Referring to Figures 4 to 8, inclusive, in which a probe suitable to perform this function is illustrated, the probe 10 is formed of a housing 86 molded of a suitable material such as hard rubber or plastic. A plunger 87, tapered on one end 87a and constructed of a hollow metal cylinder 87b partially surrounding a number of suitably configured pieces of insulating material in the manner shown in Figure 5, is slidably disposed in a cylindrical recess 88 in the housing 86. An enlarged portion 89 at the upper end of the recess 88 provides a shoulder 90 which receives a retaining ring 91 mounted on the upper end of the plunger 87. A coil spring 92 positioned in a restricted portion 93 of the recess 88 has its lower end disposed in an annular slot 94 in the plunger 87 to bias this member downwardly into the position shown in Figures 4 and 5 of the drawing. A threaded hole 95 disposed axially in the plunger 87 and opening at its upper end carries a set screw 96, an axial pin 97 extending through the plunger tip 87a and being mounted in the set screw 96. The pin 97 may be formed of an insulator or an excellent surface conductor such, for example, as heavily silvered heat treated beryllium copper wire. The end of the pin 97 is extended a desired distance out of the tip 87a by rotation of the set screw 96 through an opening 98 in the top of the housing 86, such adjustment assuring interchangeability of calibrations between various probes.

A coil form 99 secured in the tip of the plunger 87 carries the coil 12. In order to join the coil 12 to the shielded coaxial line 14, a conductor 100 connects one of its ends to the metal tube 87b which in turn is joined by a tubular conductor 101 extending through a slot 86c in the housing 86 to an outer conductor 102 of the coaxial line 14. The other end of the coil 12 is connected through a conductor 103 to a central conductor 104 of the coaxial line 14, the conductor 104 extending downwardly into the plunger 87 as shown.

The tubular conductor 101 also serves to join the coaxial line 14 to the plunger 87 so that these elements travel together when a pressure is exerted on the tip 87a of the probe 10.

It is necessary that the coil 12 be uniformly positioned with respect to any tested surface and to this end, a split ring 105 (Figures 7 and 8) is formed of a disc 106 having raised central portions 107 and 108 providing annular shoulders on both sides. Extending from the portion 107 are three equidistantly spaced bosses 109, four equidistantly spaced bosses 110 being disposed on the raised portion 108. The split ring 105 may be force fitted into a cylindrical opening 111 in the lower end of the housing 86 with either the bosses 109 or 110 extending outwardly. In the event a flat or spherical surface is to be tested, the three bosses 109 will be disposed outwardly to insure that the probe 10 is exactly perpendicular to the surface at all times. On the other hand, if a cylindrical surface is to be tested, the four bosses are utilized to make certain that a perpendicular attitude of the probe 10 is maintained.

In the use of the probe 10 illustrated in Figures 4 and 5, the tip 87a carrying the coil 12 is placed against a surface to be tested, the ring 105 having been positioned according to whether a flat or cylindrical surface is under consideration, and the probe 10 urged downwardly until the bosses 109 or 110 engage the test surface. With this arrangement, the coil 12 will be spaced slightly from the test surface in accordance with the projection of the pin 97, such spacing being adjustable by means of the set screw 96. Furthermore, since the plunger 87 will be urged downwardly by the spring 92 against the work surface, the pin 97 will be forced against it with the same force regardless of the pressure exerted by the operator on the probe 10 in holding it against the work sample. It will be understood that in the measurement of film thicknesses on the order of one mil, the deformation of the surface by the pin 97 becomes important and holding it constant in the above described manner makes possible accurate measurements of extremely thin films.

Figure 2:
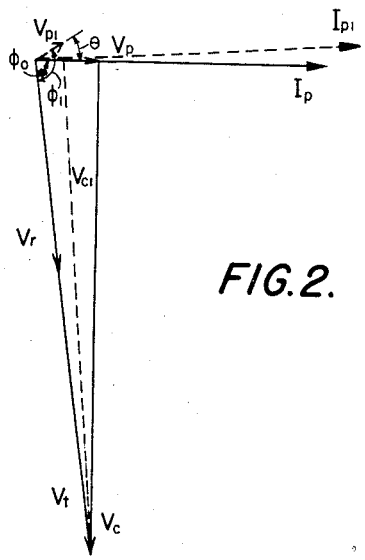
Figure 2 is a vector diagram helpful in explaining the phase relationships between various voltages in the circuits of Figures 1A and 1B.

As an aid in understanding the overall operation of the above described thickness gauge, the operating principles of several of the important circuits will first be examined. The phase relationships between several currents and voltages are shown in the vector diagram of Figure 2, the current through the phase shifting capacitor 22 and the resonant probe 10 at resonance being identified as $I_p$ and the voltage $V_p$ across the probe being in phase therewith. The voltage $V_c$ across the capacitor 22 lags the current $I_p$ by substantially 90 degrees and the sum of the voltages $V_p$ and $V_c$ is equal to the voltage $V_t$ across the tank circuit 23. As previously mentioned, the reference phase voltage $V_r$ obtained on the conductor 65 is in phase with the tank circuit voltage $V_t$. In a circuit in which preferred circuit values are utilized, the voltage $V_r$ will from an angle $\phi_0$ of about 85 degrees with the voltage $V_p$, as shown in Figure 2, when the probe is resonated. When the probe circuit is detuned as explained below, the voltage $V_p$ will assume a new position $V_{p1}$ at a new larger angle $\phi_1$ with the voltage $V_r$. Of course, the new angle $\phi_1$ could also be smaller depending on the detuning impedance.

In connection with this instrument, it should be understood that eddy currents induced by disposing a high frequency current carrying coil adjacent to a conductive material such as a metallic surface are limited to a thin surface layer. The thickness of this layer, the depth of penetration of the induced currents, is inversely proportional to the square root of the frequency of the current and directly proportional to the square root of the resistivity of the metal. For a given frequency, the magnitude of the eddy currents induced in a particular surface layer will depend upon its conductivity. If a metal film and basis metal have different conductivities, the effective conductivity of the composite surface layer will be influenced by the thickness of the metal film. The eddy currents in the surface layer set up a magnetic field which opposes that of the inducing current in the coil and thereby varies the coil impedance. Stated in other words, a certain impedance is reflected to the coil from the metallic surface depending upon the diverse characteristics of the metal film and basis material.

With the above in mind, it will be evident that holding the probe 10 adjacent to a conductive surface induces eddy currents therein, the impedance reflected back to the coil 12 detuning the resonant circuit comprising the coil 12 and capacitors 37 and 38 and causing a voltage $V_{p1}$ to lead or lag the current $I_{p1}$. A new angle $\phi_1$ which the voltage $V_{p1}$ makes with the voltage $V_r$ may be greater or smaller than the angle $\phi_0$ by an angle $\theta$. The phase detector 50 produces signals in accordance with the angle $\theta$. In other words, the change in phase relation between the voltages $V_p$ and $V_r$ is detected by the tube 50.

Of course, the foregoing conditions apply when considering the operation of the high frequency probe 11 except for the use of the heterodyning source. More particularly, when the ganged switches are moved to their high frequency position, signals supplied by the oscillator connected with the section 28b beat with the high frequency signals in the mixer tubes 43 and 68. Accordingly, assuming a high frequency of 8 mc. and a local oscillator frequency of 7.5 mc., an output signal of 500 kc. will appear at the plates of the tubes 43 and 68 bearing the same phase relation to each other as did the 8 mc. signals in the tank circuit 27 and the probe 11.

The exemplary frequencies of 500 kc. and 8 mc. have proven useful with certain basis and film materials in a selected thickness range. However, it will be understood that both lower and higher frequencies may be utilized as dictated by the combinations of materials to be tested and the thickness of the film involved in any particular measurement. For example, a frequency of 8 mc. has been found useful in measuring .2 to 1.1 mils cadmium plating on copper.

Returning to the operation of the device, the approximately quadrature signals received on the grids of the gated beam tube 50 result in output pulses on its plate having a width determined by their relative phase angle. The trimmer capacitor 55 and coupling network transformers will previously have been set to provide the exact desired phase angle between the signals in each of the channels, for example, 85 degrees, in order to obtain a reference value of current through the tube 50 which is bucked out by means of the bridge indicator circuits illustrated in Figure 3 to provide zero meter current.

As mentioned above, the indicating circuits associated with the gated beam tube 50 and the meter 82 are in the form of a bridge, this being clearly shown by the schematic circuit diagram of Figure 3. Two opposite junctions of the bridge circuit are respectively joined to B+ and ground while the other two junctions are respectively joined to the plate of the tube 50 and the resistor 72 and to the common point of the resistors 79a and 79b. The integrating capacitor 74 is connected to the plate of the tube 50. The meter sensitivity control 75 is connected across the latter two junctions, the bridge 81 and meter 82 being arranged as described in connection with Figure 1B. One side of the bridge is joined by the conductor 84 to the midpoint of the rectifiers 83a and 83b, these elements forming with the resistors 79a and 79b an overload protection circuit which limits the meter current to a predetermined value. Thus, if the meter current tends to be too high by reason of excessive voltage across the rectifier bridge 81, one or the other of the rectifiers 83a and 83b conducts which effectively limits the current flowing through the meter 82. This is due to the fact that the rectifiers are biased to a voltage which would result in damaging meter current.

The tube 50 is shown in one leg of the bridge together with input wave forms and an output wave form representative of a typical operating condition. Thus, the signals $e_{g1}$ and $e_{g3}$ applied to the tube control grids with the probe in resonance are 85 degrees ($\phi_0$) out of phase and this gives rise to square current pulses $i_p$ at the plate of the tube 50. These are integrated by the capacitor 74 to give an average current $I_b$.

It will be apparent that the resistor 72 may be adjusted to balance the bridge when the incoming signals $e_{g1}$ and $e_{g3}$ have a predetermined phase relation. Any deviation from such phase relation in either direction unbalances the bridge. However, the meter 82 indicates such deviation in one sense due to the use of the full wave rectifier bridge 81. Furthermore, if the displacement is so great as to cause a bridge unbalance giving rise to a current flow in excess of what the meter 82 can handle, the overload protection circuit including the rectifiers 83a and 83b function to protect the meter.

It will be observed that the effective screen grid resistance of the tube 50 forms a portion of one branch of the bridge, this being indicated by a resistor 86 in one leg of the bridge joined at one side to the resistor 79b and grounded at its other end.

With the basic operating principles of the thickness gauge in mind from the above discussion, some typical operations thereof will be readily understood. If it is desired to measure the thickness of a conductive material such as a metallic film on a basis metal, the appropriate probe 10 or 11, selected in accordance with the film characteristics and thickness, is placed on the basis material and the ganged tuning capacitors 37 and 38 adjusted to produce a null or zero reading on the indicator meter 82, this corresponding to an initial phase difference of 85 degrees between the signals supplied to the tube 50. The probe 10 is subsequently placed on a standard metal film deposited on the same basis material, a new relative phase shift being obtained between the probe voltage and the reference phase voltage received by the tube 50. The resultant change in output may be either positive or negative in sense, depending upon the nature of the combination of materials under test. However, the difference in signal is always indicated as a positive reading on the meter 82 due to the rectifier bridge 81. With the probe 10 engaging the standard film, the sensitivity control 78 is adjusted so that the meter pointer rests on an indicia representative of the standard film thickness. The probe 10 may then be urged against the metal films to be tested and the meter 82 directly indicates the film thickness with a high degree of accuracy. An arrangement for mounting the standard samples adjacent to the meter 82 for greatly simplifying the foregoing steps is shown in copending application Serial No. 564,671, filed February 10, 1956, for "Test Instrument Calibrating Apparatus," now Patent No. 2,862,178.

The above described thickness gauge may also be utilized in connection with determining the thickness of nonconductive film on conductive surfaces or conductive film on nonconductive surfaces. Thus, if a paint film thickness is to be examined, a basis metal adjustment is first made, as outlined above, and then a sensitivity adjustment made with a standard paint thickness sample. It should be noted that although eddy currents may not be induced in the paint film itself, a phase angle variation between the signals fed to the tube 50 will be obtained due to the increased spacing between the basis metal and the coil 12 or 13. Furthermore, if a metal film on a nonconductive surface is to be measured, there need be no basis adjustment other than resonating the probe circuits in space remote from any metal surfaces. However, since certain materials commonly thought of as being nonconductive exhibit enough conductivity to affect the probe, it is preferable to urge the probe against a piece of the basis material in most instances. The sensitivity control may then be adjusted by placing the probe against a sample metal film on the nonconductive base to provide calibration of the instrument. In situations where a thin metal film on a truly nonconductive basis material must be measured, it may be preferable to resonate the probe on a thick piece of the film and set the sensitivity control so that the thin film results in full scale deflection of the meter 82.

The above described instrument may also be used to determine metal conductivities directly. Thus, the trimmer control 37a may be calibrated so that it reads zero when the probe 10 resonates in free space, the capacitors 37 and 38 then being retuned while the probe is urged against a particular metal. Such tuning is indicated, of course, by a null or zero indication on the meter 82, the displacement of the trimmer control from zero necessary to retune the probe 10 providing a direct indication of conductivity.

Since flaws in metal pieces vary the metal characteristics, the above described instrument embodying the present invention may be utilized as a flaw detector. Thus, the meter 82 may be set at a null point while the probe 10 rests against a sample piece, any deviation from this reading indicating the presence of a flaw in the article under inspection.

As mentioned above, separate limiters and a phase detector may be employed in place of the gated beam tube 50 described and illustrated in the present embodiment of the invention. Furtherfore, other arrangements for providing a suitable phase difference between the probe voltage and the reference phase voltage may be utilized within the scope of the present invention. Accordingly, it will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. Testing apparatus comprising a tunable resonant circuit including a coil adapted to be positioned adjacent to a conductive surface, means for providing a reference phase voltage, means for energizing the resonant circuit with a voltage substantially out of phase with the reference phase voltage, and means responsive to the reference phase voltage and the resonant circuit voltage for producing a signal that is a function only of the phase difference between the two voltages.

2. Testing apparatus comprising a tunable resonant circuit including a coil adapted to be positioned adjacent to a conductive surface, means for generating an alternating voltage, means for coupling said voltage through a phase shifting network to said resonant circuit, means for deriving a reference phase voltage from said alternating voltage, and means responsive to the reference phase voltage and the resonant circuit voltage for producing a signal that is a function only of the phase difference between the latter two voltages.

3. Testing apparatus comprising a tunable resonant circuit including a coil adapted to be positioned adjacent to a conductive surface, means for generating an alternating voltage, means for coupling said voltage through a phase shifting network to said resonant circuit, means for deriving a reference phase voltage from said alternating voltage, means for coupling said reference phase voltage and said resonant circuit voltage to amplitude limiting means for limiting said two voltages to predetermined values, and means responsive to the limited reference phase and resonant circuit voltages for producing a signal representative of the phase difference between the latter two voltages.

4. Testing apparatus comprising a tunable resonant circuit including a coil adapted to be positioned adjacent to a conductive surface, an oscillator for providing an alternating voltage, a phase shifting network for coupling the voltage to the resonant circuit, means for deriving a reference phase voltage from said alternating voltage, and means responsive to the reference phase voltage and the resonant circuit voltage for producing a signal that is a function only of the phase difference between the latter two voltages.

5. Testing apparatus comprising a tunable resonant circuit including a coil adapted to be positioned adjacent to a conductive surface, an oscillator for providing an alternating voltage, a phase shifting network for coupling the voltage to the resonant circuit, means for deriving a reference phase voltage from said alternating voltage, and means for amplitude limiting the reference phase and the resonant circuit voltages and for producing a signal representative of the phase difference between the latter two voltages.

6. Testing apparatus comprising a tunable resonant circuit including a coil adapted to be positioned adjacent to a conductive surface, an oscillator for providing an alternating voltage, a phase shifting network for coupling the voltage to the resonant circuit, means for deriving a reference phase voltage from said alternating voltage, means including a common local oscillator for heterodyning the resonant circuit voltage and the reference phase voltage to a lower frequency, and means responsive to the reference phase voltage and the resonant circuit voltage for producing a signal representative of the phase difference between the latter two voltages.

7. Testing apparatus comprising a tunable resonant circuit including a coil adapted to be positioned adjacent to a conductive surface, an oscillator for providing an alternating voltage, a phase shifting network for coupling the voltage to the resonant circuit, means for deriving a reference phase voltage from said alternating voltage, means responsive to the reference phase voltage and the resonant circuit voltage for producing a signal representative of the phase difference between the latter two voltages, a bridge including four arms, said phase detector means being disposed in one arm of the bridge, the remaining three arms of the bridge including resistance means adjustable to produce a potential across two opposite junctions of the bridge proportional to the phase difference signal, a pair of series connected rectifiers coupled across one of the opposite junctions remote from the phase detecting means to bypass a portion of the resistance in the bridge arms forming said one opposite junction, a meter circuit connected across the two opposite junctions, and a conductor joining the rectifiers to a point in the meter circuit varying in potential with the potential across the opposite junctions so that the meter is protected from excessive currents.

8. A gauge for determining the thickness of film on a basis material comprising a resonant circuit including a coil, a probe carrying the coil and adapted to dispose it adjacent to the film, an oscillator providing an alternating voltage, a phase shifting network coupling the voltage to the resonant circuit, means for tuning the circuit to resonance while the coil is adjacent to a material having the same electrical characteristics as the basis material, circuit means deriving a reference phase voltage from said alternating voltage, first means coupling the resonant circuit voltage to amplitude limiting and phase detecting means, second means coupling the reference phase voltage to the amplitude limiting and phase detecting means, indicator means responsive to the output of said amplitude limiting and phase detecting means for indicating the phase difference between the resonant circuit voltage and the reference phase voltage, and means for calibrating the gauge by adjusting the sensitivity of the indicator means while the coil is adjacent to a film thickness standard.

9. A gauge as defined in claim 8 in which a local oscillator furnishes heterodyning signals to the first and second coupling means to reduce the frequency of the resonant circuit voltage and the reference phase voltage.

10. A gauge for determining the thickness of film on a basis material comprising two resonant circuits each including a coil, two probes carrying the coils and adapted to dispose them adjacent to the films, oscillator means selectively providing a lower and higher frequency alternating voltage, a phase shifting network associated with each of the resonant circuits selectively coupling one of the voltages to the corresponding resonant circuit, means for tuning the circuit to resonance while the coil is adjacent to a material having the same electrical characteristics as the basis material, circuit means deriving a reference phase voltage from the voltage exciting the selected resonant circuit, a local oscillator for generating signals at a frequency differing from the higher frequency alternating voltage by an amount equal to the lower frequency alternating voltage, first means coupling the selected resonant circuit voltage to amplitude limiting and phase detecting means, second means coupling the reference phase voltage to the amplitude limiting and phase detecting means, means heterodyning the local oscillator signals with the higher frequency resonant circuit voltage and the higher frequency reference phase voltage in the first and second coupling means to produce voltages at the lower frequency, indicator means responsive to the output of said amplitude limiting and phase detecting means for indicating the phase difference between the resonant circuit voltage and the reference phase voltage, and means for calibrating the gauge by adjusting the sensitivity of the indicator means while the coil is adjacent to a film thickness standard.

References Cited in the file of this patent

UNITED STATES PATENTS

| | | |
|---|---|---|
| 2,447,911 | Mages et al. | Aug. 24, 1948 |
| 2,516,756 | Cowley et al. | July 25, 1950 |
| 2,581,394 | Dinger | Jan. 8, 1952 |
| 2,584,800 | Grisdale | Feb. 5, 1952 |
| 2,660,704 | Harmon et al. | Nov. 24, 1953 |
| 2,662,996 | Martin | Dec. 15, 1953 |
| 2,676,298 | Frommer | Apr. 20, 1954 |
| 2,728,879 | Erikson | Dec. 27, 1955 |
| 2,764,734 | Yates | Sept. 25, 1956 |
| 2,806,992 | Foerster | Sept. 17, 1957 |